United States Patent [19]

Strasser et al.

[11] 4,410,285

[45] Oct. 18, 1983

[54] CERAMIC AND METAL ARTICLE AND METHOD OF MAKING IT

[75] Inventors: Franz Strasser, Jetzendorf; Ludwig Steinhauser, Maisach; Bernd Kugenbuch, Adelshofen, all of Fed. Rep. of Germany

[73] Assignee: MTU Motoren Und Turbinen Union Munchen GmbH, Munich, Fed. Rep. of Germany

[21] Appl. No.: 252,743

[22] Filed: Apr. 10, 1981

[30] Foreign Application Priority Data

Apr. 16, 1980 [DE] Fed. Rep. of Germany ....... 3014645

[51] Int. Cl.³ ............................................. F16C 17/22
[52] U.S. Cl. .................................... 384/278; 384/277; 384/279; 384/297; 308/DIG. 8
[58] Field of Search ................. 308/37, 238, DIG. 14, 308/237 A, 237 R, DIG. 8; 428/613, 627, 629, 632, 633, 552, 557; 384/278, 277, 297, 279

[56] References Cited

U.S. PATENT DOCUMENTS

| | | | |
|---|---|---|---|
| Re. 28,354 | 3/1975 | Orkin | 308/DIG. 14 |
| 3,366,409 | 1/1968 | Milch | 287/189.365 |
| 3,386,160 | 6/1968 | Milch | 29/473.1 |
| 3,428,374 | 2/1969 | Orkin et al. | 308/DIG. 14 |
| 4,003,715 | 1/1977 | Cascone | 29/182.3 |
| 4,238,137 | 12/1980 | Furchak et al. | 308/238 |
| 4,319,790 | 3/1982 | Thomson | 308/238 |

FOREIGN PATENT DOCUMENTS 821690 10/1959 United Kingdom ............... 428/608

Primary Examiner—Lenard A. Footland
Attorney, Agent, or Firm—Alan H. Levine

[57] ABSTRACT

An article comprising a component of ceramic material and a metal component has a metal felt located between opposed faces of the two components, the metal felt being permanently joined to both the ceramic face and the metal face to join the two components together. The metal felt may be brazed to both components, the brazing alloy being one which chemically combines with the ceramic material. The brazing alloy may be in the form of a foil placed between the metal felt and each of the components, and the brazing may take place in a vacuum.

6 Claims, 4 Drawing Figures

CERAMIC AND METAL ARTICLE AND METHOD OF MAKING IT

This invention relates to an article having metal and ceramic components, and especially to such an article of rotationally symmetrical form.

Owing to the known, specific material properties of ceramics (e.g., $Al_2O_3$, reaction-bound or hot pressed $Si_3N_4$, or SiC), it is generally considered desirable to make thermally highly-stressed articles fully or partly of a ceramic material. This frequently involves the need for a permanent joint between the ceramic and metal components of the article. Currently known joining methods resort to shrunk or bonded joints. Owing to the disparate material properties of ceramic materials, on the one hand, and metal, on the other, and especially owing to their widely different coefficients of thermal expansion, it has been shown that the known joints will not safely sustain the stresses accompanying unlike coefficients of thermal expansion and therefore lack strength.

It is a broad object of the present invention to provide a ceramic and metal article, especially of rotationally symmetric form, which offers a safe and durable joint between the metal and ceramic material.

It is a particular object of the present invention to provide an arrangement wherein metal felt is inserted between the ceramic material and the metal, the felt being inseparabley joined at the respective interface to the metal and to the ceramic material.

Use of metal felt as a layer interposed between the ceramic material and the metal eliminates the problem of unlike thermal expansion of ceramic material and metal, respectively. The reason is that thermally caused changes in form are completely absorbed in the metal felt layer, so that the occurrence of thermally induced stresses between the metal and the ceramic material are practically eliminated.

In a preferred embodiment of the present invention, the joints of a ceramic/metal article between the metal felt and the ceramic material, on the one hand, and between the metal felt and the metal, on the other, are brazed. Use is preferably made of a brazing alloy which combines chemically with the ceramic material at brazing temperature (i.e., an active brazing alloy). This enables a particularly intimate union to be achieved between the brazing alloy and the ceramic material. With the standard oxide, nitride, or carbide ceramics it will be helpful to use a silver alloy containing titanium for brazing. The brazing alloy preferably contains 4.5% Ti, 26.5% Cu, and 69% Ag, by weight. The high affinity of titanium will operate to superficially break up the oxide, nitride, or carbide bond of the ceramic material, thus causing a transitional titanium oxide, nitride, or carbide zone of excellent adhesion.

In order to prevent impairment of the performance of the active alloying metal, the heating cycle, the brazing temperature, the brazing time, and the negative pressure should all be accurately adjusted to one another.

As a metal felt, use is preferably made of X15 CrSI 2520. However, this does not preclude the use of materials of the U.S. standard designations SS 309 or SS 316, or of the sufficiently familiar Inconel X 750 in metal felt form.

It has been shown that the ceramic joints just described can be used to special advantage for shaft-to-hub applications or on ceramic bearings.

The invention further relates to a method for manufacturing ceramic/metal articles, characterized in that a suitable brazing alloy in the form of foil is inserted between the ceramic material and the metal felt, and between the metal felt and the metal, and is then vacuum brazed at brazing temperature.

The use of brazing alloy in the form of foil improves large-area brazing of metal felt to ceramic material, on the one hand, and of metal felt to metal, on the other, particularly since it enables a brazing alloy layer of accurately predictable thickness and area to be achieved. The brazing alloy is thus prevented, especially with ceramics of considerable surface porosity, such as reaction-bonded silicon nitride, from penetrating too deeply into the pores. Otherwise, destruction of the ceramic surface by severe shrink stresses would be a danger.

Carrying out the process in a vacuum affords the advantage that surface oxidation is prevented and adequate wettability of the surfaces is thus ensured.

Embodiments of articles having ceramic and metal components designed in accordance with the present invention are illustrated on the accompanying drawings, in which.

Figure 1:
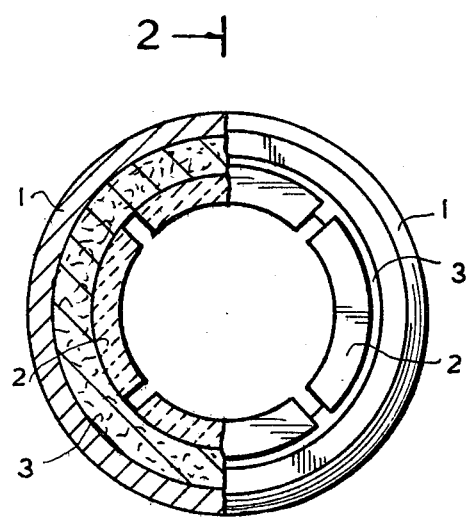
FIG. 1 is transverse cross-sectional view, partly in elevation, illustrating a segmented ceramic bearing.
Figure 2:
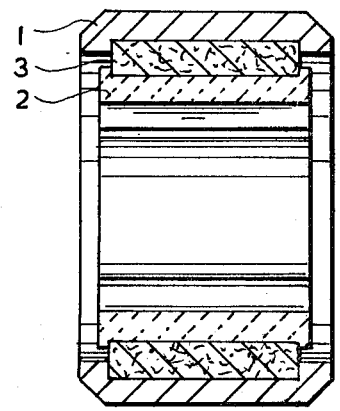
FIG. 2 is a longitudinal cross-sectional view taken along line 2—2 of FIG. 1.

With reference to FIGS. 1 and 2, an outer metal ring is indicated by the numeral 1, and an inner bearing ring of a ceramic material by the numeral 2. Located between the metal ring 1 and the bearing ring 2 is a ring 3 of metal felt. The metal felt ring 3 is brazed over its entire outer circumference to the metal ring 1, and is brazed over its entire inner circumference to the bearing ring 2. In the embodiment shown, the bearing ring 2 comprises four different segments, seen in FIG. 1. Use could alternatively be made of a one-piece bearing ring.

Figure 3:
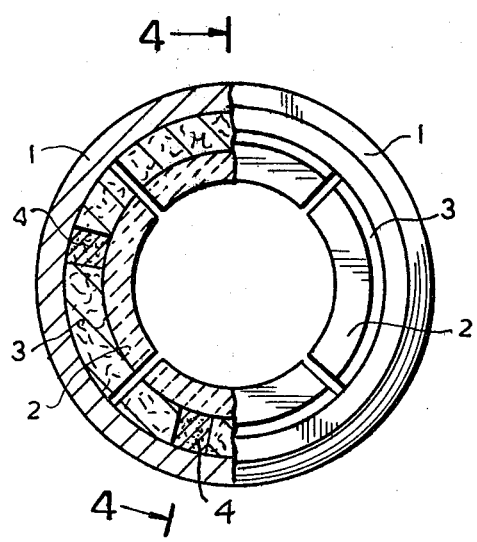
FIG. 3 is a transverse cross-sectional view, partly in elevation, illustrating a segmented ceramic tilting bearing.
Figure 4:
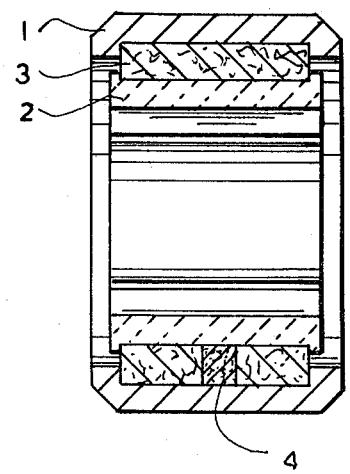
FIG. 4 is a longitudinal cross-sectional view taken along line 4—4 of FIG. 3.

The bearing illustrated in FIGS. 3 and 4 is a segmented tilting bearing. It includes essentially the same construction as the bearing of FIGS. 1 and 2, having an outer metal ring 1, a metal felt ring 3, and an inner bearing ring 2 of a ceramic material. But in this embodiment, each of the ceramic bearing ring 2 and the metal felt ring 3 comprises several parts, i.e., these rings have four segments each (see FIG. 3). The tilting function of the bearing is provided by four openings arranged at four circumferentially equally spaced points in one plane. The openings are provided in the metal felt ring 3 to receive metal felt plugs 4 of considerable greater strength than that of the metal felt ring 3. This provides a tilting plane allowing some degree of tilting movement of a shaft or stud supported in the bearing ring.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A bearing comprising an outer metal ring, an inner ceramic ring within the outer ring, and a metal felt ring located between the outer and inner rings, the metal felt ring being brazed to both the outer metal and inner ceramic rings.

2. An article as defined in claim 1 including a brazing alloy between the metal felt and the ceramic ring, the brazing alloy being chemically combined with the ceramic material.

3. An article as defined in claim 1 wherein the brazing alloy contains 0–50% Cu, 1–70% Ti, and 0–90% Ag, by weight.

4. An article as defined in claim 1 wherein the metal felt is made of X15 Cr Ni Si 2520.

5. An article as defined in claim 1 wherein the inner ceramic ring is composed of ring segments.

6. An article as defined in claim 1 including openings in the metal felt ring at circumferentially equally spaced points, and metal felt plugs in the openings, the plugs being of greater stiffness than the metal felt ring.

* * * * *